US007340686B2

(12) United States Patent
Matthews et al.

(10) Patent No.: US 7,340,686 B2
(45) Date of Patent: Mar. 4, 2008

(54) OPERATING SYSTEM PROGRAM LAUNCH MENU SEARCH

(75) Inventors: David A. Matthews, Seattle, WA (US); Charles W. Stabb, Seattle, WA (US); Matthew R. Lerner, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 11/085,654

(22) Filed: Mar. 22, 2005

(65) Prior Publication Data

US 2006/0218503 A1   Sep. 28, 2006

(51) Int. Cl.
*G06F 3/00* (2006.01)
(52) U.S. Cl. ...................................... 715/779
(58) Field of Classification Search ............... 715/708, 715/779
See application file for complete search history.

(56) References Cited

U.S. PATENT DOCUMENTS

| | | | |
|---|---|---|---|
| 5,682,469 A * | 10/1997 | Linnett et al. ............... | 345/473 |
| 5,923,328 A | 7/1999 | Griesmer | |
| 6,348,935 B1 | 2/2002 | Malacinski et al. | |
| 6,618,771 B1 | 9/2003 | Leja et al. | |
| 6,847,959 B1 | 1/2005 | Arrouye et al. | |
| 2001/0028368 A1 | 10/2001 | Swartz et al. | |
| 2002/0154157 A1 | 10/2002 | Sherr et al. | |
| 2003/0098891 A1 | 5/2003 | Molander | |
| 2004/0019610 A1 | 1/2004 | Burns | |
| 2004/0215649 A1 | 10/2004 | Whalen et al. | |
| 2005/0240815 A1 | 10/2005 | Purkeypike et al. | |
| 2005/0283468 A1 * | 12/2005 | Kamvar et al. ................ | 707/3 |
| 2005/0289109 A1 | 12/2005 | Arrouye et al. | |
| 2006/0101347 A1 * | 5/2006 | Runov et al. ............... | 715/764 |

FOREIGN PATENT DOCUMENTS

| | | |
|---|---|---|
| JP | 5020005 | 1/1993 |
| JP | 5080997 | 4/1993 |
| JP | 7064748 | 3/1995 |
| WO | WO 2004/023243 | 3/2004 |

OTHER PUBLICATIONS

Screen Dumps of Microsoft Windows 5.1 (2001, pp. 1-13).*

(Continued)

*Primary Examiner*—Kristine Kincaid
*Assistant Examiner*—Lê Nguyen
(74) *Attorney, Agent, or Firm*—Banner & Witcoff Ltd.

(57) ABSTRACT

An operating system program launch menu, such as a Start menu, provides various mechanisms for a user to quickly and efficiently locate and launch desired data items such as programs, data files, storage locations, and the like. A search box within the program launch menu may be used to quickly locate programs, documents, communications, and other data items. An auto-complete feature may be used, e.g., when the user restricts the locations searched for the user-entered search text. A most commonly used program list may include programs based on various criteria including both frequency of use and recent use, thereby always including a most recently used item. An all programs view may display programs and documents in a hosted-tree view within the original confines of the program launch menu, thereby negating the need to open sub-menus on top of a large portion of the desktop displayed on the display device.

20 Claims, 10 Drawing Sheets

OTHER PUBLICATIONS

Apple—Mac OS X—Features—Expose, printed from http://www.apple.com/macosx/features/expose/ on Mar. 18, 2005, 3 pages.
Apple—Mac OS X—Feagures—Finder, printed from http://www.apple.com/macosx/features/finder/ on Mar. 28, 2005, 3 pages.
Spotlight, "Find anything on your Mac instantly", Technology Preview Mac OS X: Spotlight, dated Jan. 2005, pp. 1-16.
Tree-menu example 1, printed from http://dhtml-menu.com/tree-examples/tree-menuxp.html on Mar. 18, 2005, 2 pages.
Software application Runltl, printed from http://www.softpile.com/Desktop/Miscellaneous/Review_1093 . . . on Mar. 18, 2005.
Program "PS Hot Launch VV", printed from http://www.pssoftlab.com/pshi_info.phtml on Mar. 18, 2005, 4 pages.
Quick Menu Builder, printed from http://www.quickmenubuilder.com/Menu.php?page=Intro on Mar. 18, 2005, 2 pages.
Software Program, "ObjectBar" printed from http://www.stardock.com/products/objectbar/information.asp on Mar. 18, 2005, 7 pages.
Bill C., "Customizing Your Windows XP Start Menu," printed from http://www.youthtech.com/techstuff/explore_windowsxp/custom... on Mar. 18, 2005, 7 pages.
Microsoft Windows XP—Start menu overview, printed from http://www.microsoft.com/resources/documentation/windows/xp/ . . . on Mar. 18, 2005, 1 page.
Software application "1$^{st}$ TurboRun", downloadable from http://www.turborun.com/download/turborun.exe as of Mar. 23, 2005.
"Screen Dumps of Microsoft Windows 5.1", 2001, pp. 1-13.

* cited by examiner

- Activate Windows
- Windows Catalog
- Windows Update
- Accessories
  - Accessibility
    - Accessibility Wizard
    - Magnifier
    - Narrator
    - On-Screen Keyboard
    - Utility Manager
  - Communications
    - HyperTerminal
    - Network Connections
    - Network Setup Wizard
    - New Connection Wizard
    - Remote Desktop Connection
    - Wireless Network Setup Wizard
  - Entertainment
    - Sound Recorder
    - Volume Control
    - Windows Media Player
  - System Tools
    - Activate Windows
    - Backup
    - Character Map
    - Disk Cleanup
    - Disk Defragmenter
    - Files and Settings Transfer Wizard
    - Scheduled Tasks
    - Security Center
    - System Information
    - System Restore
    - Off
    - Logoff
    - Switch User
    - Show Desktop
    - Lock
  - Address Book
  - Calculator
  - Command Prompt
  - Notepad
  - Paint
  - Program Compatibility Wizard
  - Synchronize
  - Tour Windows
  - Windows Explorer
  - WordPad
  - Run
  - Help
  - Getting Started
- Startup
- Internet Explorer
- MSN
- Outlook Express
- Remote Assistance
- Windows Media Player
- Windows Messenger
- Windows Movie Maker

FIG. 10

| | |
|---|---|
| 1. | <Foo>'s Computer |
| 2. | Accessibility -> (sub folder) |
| a) | Accessibility Options |
| b) | Accessibility Wizard |
| c) | Magnifier |
| d) | Narrator |
| e) | On-Screen Keyboard |
| f) | Utility Manager |
| 3. | Accessories -> (sub folder) |
| a) | Calculator |
| b) | Character Map |
| c) | Command Prompt |
| d) | HyperTerminal |
| e) | Journal |
| f) | Notepad |
| g) | Paint |
| h) | Snipper |
| i) | Sound Recorder |
| j) | Sticky Notes |
| k) | Synchronize |
| l) | WordPad |
| 4. | Activate Windows (when appropriate) |
| 5. | Administrative Tools -> (sub folder – hidden by default) |
| a) | Component Services |
| b) | Computer Management |
| c) | Data Sources (ODBC) |
| d) | Event Viewer |
| e) | Local Security Policy |
| f) | Microsoft .NET Framework 1.1 Configuration |
| g) | Microsoft .NET Framework 1.1 Wizards |
| h) | Performance |
| i) | Services |
| 6. | Connect To -> (sub folder, only once connectoids exist) |
| a) | Connectoid 1 |
| b) | Connectoid 2 |
| c) | etc |
| 7. | Documents & Notes |
| 8. | Games |
| 9. | Getting Started |
| 10. | Help |
| 11. | Internet Explorer |
| 12. | Media Player |
| 13. | Messenger |
| 14. | Movie Maker |
| 15. | Movies & Television |
| 16. | Music & Radio |
| 17. | Outlook Express |
| 18. | People & Groups |
| 19. | Photos & Videos |
| 20. | Presentation -> (sub folder, Mobile SKU only) |
| a) | option 1 |
| b) | option 2 |
| c) | option 3 |
| 21. | Remote Assistance |
| 22. | Remote Desktop Connection |
| 23. | Run |
| 24. | Search |
| 25. | Software Explorer |
| 26. | Windows Catalog |

FIG. 11A

| | |
|---|---|
| 27. | Control Panel -> (sub folder) |
| a) | Add Hardware |
| b) | Administrative Tools |
| c) | Backup |
| d) | Date and Time |
| e) | Disk Cleanup |
| f) | Disk Defragmenter |
| g) | Display |
| h) | Files and Settings Transfer Wizard |
| i) | Folder Options |
| j) | Fonts |
| k) | Game Controllers |
| l) | Hardware and Devices |
| m) | Internet Options |
| n) | Keyboard |
| o) | Mail |
| p) | Mouse |
| q) | Network Connections |
| r) | New Connection Wizard |
| s) | Network Setup Wizard |
| t) | Phone and Modem Options |
| u) | Power |
| v) | Printers and Faxes |
| w) | Program Compatibility Wizard |
| x) | Regional and Language Options |
| y) | Scanners and Cameras |
| z) | Scheduled Tasks |
| aa) | Sounds and Audio Devices |
| bb) | Speech |
| cc) | Startup |
| dd) | System |
| ee) | System Information |
| ff) | System Restore |
| gg) | Taskbar and Start Menu |
| hh) | User Accounts |
| ii) | Windows Update |

FIG. 11B

| Priority | Match Source | Item Location | Tie breaking rule/sort order |
|---|---|---|---|
| 1 | Meta data | Start menu pin list | Order in pin list |
| 2 | Meta data | Quick launch | Order in Quick launch |
| 3 | Meta data | Start menu MCU | Usage points (MCU order) |
| 4 | Meta data | Start menu All Programs | Usage points (MCU order) |
| 5 | Meta data | Executables outside the Start menu | Alphabetical |
| 7 | Meta data | Favorites | Order in Favorites |
| 9 | Meta data | History | Date last visited |
| 10 | Meta data | Recent docs folder | Date modified |
| 11 | Meta data | All other user files | Alphabetical |
| 12 | Full text | Start menu pin list | Order in pin list |
| 13 | Full text | Quick launch | Order in Quick launch |
| 14 | Full text | Start menu MCU | Usage points (MCU order) |
| 15 | Full text | Start menu All Programs | Usage points (MCU order) |
| 16 | Full text | Favorites | Order in Favorites |
| 17 | Full text | History | Date last visited |
| 18 | Full text | Recent docs folder | Date modified |
| 19 | Full text | All other user files | Alphabetical |

FIG. 13

| Priority | Match Source | Item location | Tie breaking rule |
|---|---|---|---|
| 0 | Special | Keyboard shortcut table (U, L, etc) P2 | |
| 1 | Path | Path (First word full string match) Show result as "Run <search string>" | n/a |
| 2 | n/a | Fully formed URL | n/a |
| 3 | Meta data | Start menu pin list | Order in pin list |
| 4 | Meta data | Quick launch | Order in Quick launch |
| 5 | Meta data | Start menu MCU | UEM points (MCU order) |
| 7 | Meta data | Start menu All Programs | UEM points (MCU order) |
| 9 | Meta data | Executables outside the Start menu | Alphabetical |
| 10 | Meta data | Favorites | Order in Favorites |
| 11 | Meta data | History | Date last visited |
| 12 | Meta data | Recent docs folder | Date modified |
| 13 | Meta data | All other user files | Alphabetical |
| 14 | Full text | Start menu pin list | Order in pin list |
| 15 | Full text | Quick launch | Order in Quick launch |
| 16 | Full text | Start menu MCU | UEM points (MCU order) |
| 17 | Full text | Start menu All Programs | UEM points (MCU order) |
| 18 | Full text | Favorites | Order in Favorites |
| 19 | Full text | History | Date last visited |
| 20 | Full text | Recent docs folder | Date modified |
| 21 | Full text | All other user files | Alphabetical |

FIG. 14

OPERATING SYSTEM PROGRAM LAUNCH MENU SEARCH

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to computers and computer operating systems. More specifically, the invention provides methods and system for a search box and search capabilities in a graphical user interface of a program launch menu for an operating system.

BACKGROUND OF THE INVENTION

Computer operating systems have evolved significantly in recent years. Typically, these systems have a shell that provides a graphical user interface (GUI) to an end-user. The shell consists of one or a combination of software components that provide direct communication between the user and the operating system. Speed improvements in computer hardware, e.g., memory, hard drives, processors, graphics cards, system buses, and the like, have enabled richer GUIs that are drastically easier for users to comprehend. Accompanying hardware price reductions have made computer systems more affordable, enabling broad adoption of computers as productivity tools and multimedia systems. GUIs have allowed users who may have been unschooled or unfamiliar with computers to quickly and intuitively grasp the meaning of desktops, icons, windows, and applications, and how the user can interact with each.

The desktop illustrated in FIG. 2 has become the standard graphical metaphor for modern GUIs. The interface is designed to model the real world activity of working at a desk. The desktop typically occupies the entire surface of a single display device, or may span multiple display devices, and hosts subordinate user interface objects such as icons, menus, cursors and windows. The desktop serves as a base work area, where multiple documents and applications can sit open.

An operating system, such as Microsoft Windows XP® brand or Windows 2000® brand operating systems, typically comprise a graphical method for launching new software applications within its GUI. FIG. 2 illustrates a well-known example of how this may be accomplished in the Windows XP operating system. The screenshot 200 displays desktop 201, bordered on one side by taskbar 203, and featuring open window 202. When a user desires to launch a new application, the user moves a pointer (also referred to as a cursor) controlled by a mouse, trackball, or the like and clicks on the appropriate menu item in the Start Menu 204, which is itself first invoked by clicking on the Start button 205. The Start button 205 is generally located in a fixed location on the taskbar 203. A user may adjust the location of the taskbar 203, but once in place, the Start button 205 becomes a constant and familiar starting point for the user to launch new applications.

When a user clicks on the Start button 205 in FIG. 2, the Start Menu 204 appears as a floating list on top of the currently open window 202 and desktop 201. A subsequent submenu 206 of the Start Menu 204, here triggered when the user clicks on or hovers over the "Programs" list item, appears on top of and to the right of the original Start Menu in order to show more choices.

Program launching menus (e.g., the Start Menu) that use pop-up menus to display all programs, such as is illustrated in FIG. 2, have previously been limited in their organization and the functions that a user can perform. It can be difficult for users to navigate through very long lists with deep folder structures. Users often become frustrated when trying to find a desired application or document in the program launch menu because the information in a program launch menu is often cluttered and unorganized, and users often accidentally open or close folders as they are navigating through large cluttered launch menus. In addition, large pop-up menus often appear unattractive to users and do not appear to be designed to fit within a program launch menu very well. While a user can manually organize his or her program launch menu to minimize at least some of the clutter, this can be tedious and time consuming, and not all users are of an experience level to know how to organize their program launch menus.

One organizational feature that has been used in program launch menus is to provide a list of shortcuts to most frequently used (MFU) or most recently used (MRU) items. However, MFU and MRU lists do not always accurately reflect those applications and/or documents currently desired by a user. A MFU list, e.g., will not necessarily display a recently used document or application, and a MRU list will not necessarily display a frequently used document or application.

Thus, it would be an advancement in the art to provide a program launch menu in an operating system, where the program launch menu provided more intuitive organization and provided features which allow a user to more efficiently find a desired application or document.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, various illustrative aspects of the present invention are directed to a program launch menu and improvements thereto, for example, including but not limited to an improved search facility within a program launch menu, improved navigational capabilities of selectable items within a program launch menu, and improved heuristics for the selection of items that appear on a list of commonly used items within a program launch menu.

According to an illustrative aspect of the invention, a computer may assist in performance of a method for displaying a list of historically selected items in a menu of a computer program. The method may include determining a most frequently used (MFU) item, determining a most recently used item (MRU), and displaying on a computer display device the MFU item and the MRU item in the list in a menu. The menu may optionally be a program launch menu, such as a Start menu. The selection of the MRU and MFU items may optionally be based on a number of usage points associated with each selectable item, wherein items with the highest number of usage points are included in the list. The usage points may be determined by adding points when an item is used by a user, and subtracting points as an item goes unused by the user. When an item is used, it may optionally receive enough usage points to ensure that the item will be included in the list, e.g., by adding enough usage points to equal the usage points of the last item previously included on the list.

According to another illustrative aspect of the invention, one or more computer readable media may store computer software for selecting items for display in a program launch menu of an operating system. The method may include determining a number of usage points corresponding to each of a plurality of items capable of inclusion in the program launch menu by assigning an initial number of usage points to each of the plurality of items. When one of the plurality of items is launched within the operating system, the software increases usage points corresponding to that item. The software decreases usage points corresponding to any item that is not launched within the operating system for one or more predetermined periods. The software determines a predetermined number of the plurality of items as having the largest numbers of usage points, and displays in the program launch menu the determined items.

According to an illustrative aspect of the invention, a program launch menu, such as a Start menu, displays a search text input box within the program launch menu displayed on a computer display device, which can be used to locate user-selectable items on a computer system. Various aspects of the invention may provide for a display of search results within the program launch menu, the search results identifying selectable items matching text input received from a user via the search text input box. The search results may optionally be grouped according to a type of each matching selectable item, e.g., application, document, Internet, communication, etc., and may optionally be ranked within each group based on one or more secondary criteria, such as a modification date. According to various aspects of the invention, searches may be conducted against metadata of each selectable item, or against a full-text search of the contents of selectable items, as appropriate.

According to an illustrative aspect of the invention, one or more computer readable media may store computer software for providing a keyboard shortcut for launching an item stored on the computer system. Upon detection that a user has pressed a program launch menu key on a keyboard directly or indirectly connected to the computer system, the computer displays a program launch menu on a display device directly or indirectly connected to the computer system. Upon displaying the program launch menu, the computer automatically provides an input focus to a search text input box within the program launch menu displayed on the computer display device. The computer displays search results within a predefined area of the program launch menu, wherein the search results comprise selectable items matching text input received from the user via the search text input box, and automatically provides selection focus to a top search result. The computer launches the selectable item corresponding to the top search result when receiving predefined user input, e.g., <Enter>, while the top search result has the selection focus.

According to yet another illustrative aspect of the invention, one or more computer readable media may store software for providing a program launch menu. The software may display a program launch menu on a display device of a computer system, where the program launch menu is capable of displaying at least three views. A first view may display all application programs in a user-navigable structure. A second view may display the most commonly used selectable items including a most recently viewed item and a most frequently used item. A third view may display search results of selectable items matching text input received from a user via a search text input box displayed within the program launch menu. The user may toggle between the views using a toggle control displayed on the computer screen. If the user enters text in a search box, the search results view may automatically be displayed.

According to another illustrative aspect of the invention, there is a method of displaying on a computer display device a list of selectable items in a program launch menu of an operating system executing on a computer system. The method may include displaying on a computer display device a program launch menu having a predefined area in which a plurality of selectable items can be displayed, where the plurality of selectable items are arranged according to a hierarchy, and where each item comprises one of an expandable item and a launchable item. The method may initially display in the predefined area a first subset of the plurality of selectable items, where each selectable item in the first subset is at a top level of the hierarchy. Responsive to a user selecting a first expandable item in the first subset, the method may rearrange items within the predefined area to provide room to hierarchically display in the predefined area a second subset of the plurality of selectable items, the second subset including one or more children items of the first expandable item. The method may, responsive to the user selecting any launchable item displayed in the predefined area, execute a program application associated with the launchable item. The display of the selectable items may optionally be a hosted or nested tree view of the items.

According to another illustrative aspect of the invention, one or more computer readable media may store computer software for displaying a nested or hosted tree view of a plurality of selectable menu items in a predefined area of a program launch menu displayed on a computer display device.

According to another illustrative aspect of the invention, a computer system may include stored software to display a nested tree view of a plurality of selectable items within a non-computer-resizable predefined area of a program launch menu. Optionally, responsive to a user selecting a first expandable item in the nested tree view, the software rearranges items within the predefined area to provide room to hierarchically display in the predefined area a subset of the plurality of selectable items, the subset including one or more children items of the first expandable item. The software may launch an application program corresponding to a user-selected launchable item from the plurality of selectable items displayed in the predefined area.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 10 illustrates a menu hierarchy that may be used according to one or more illustrative aspects of the invention.

FIGS. 11A and 11B illustrate an alternative menu hierarchy that may be used according to one or more illustrative aspects of the invention.

FIG. 13 illustrates tie-breaking rules for search results according to an illustrative aspect of the invention.

FIG. 14 illustrates tie-breaking rules for search results according to an illustrative aspect of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
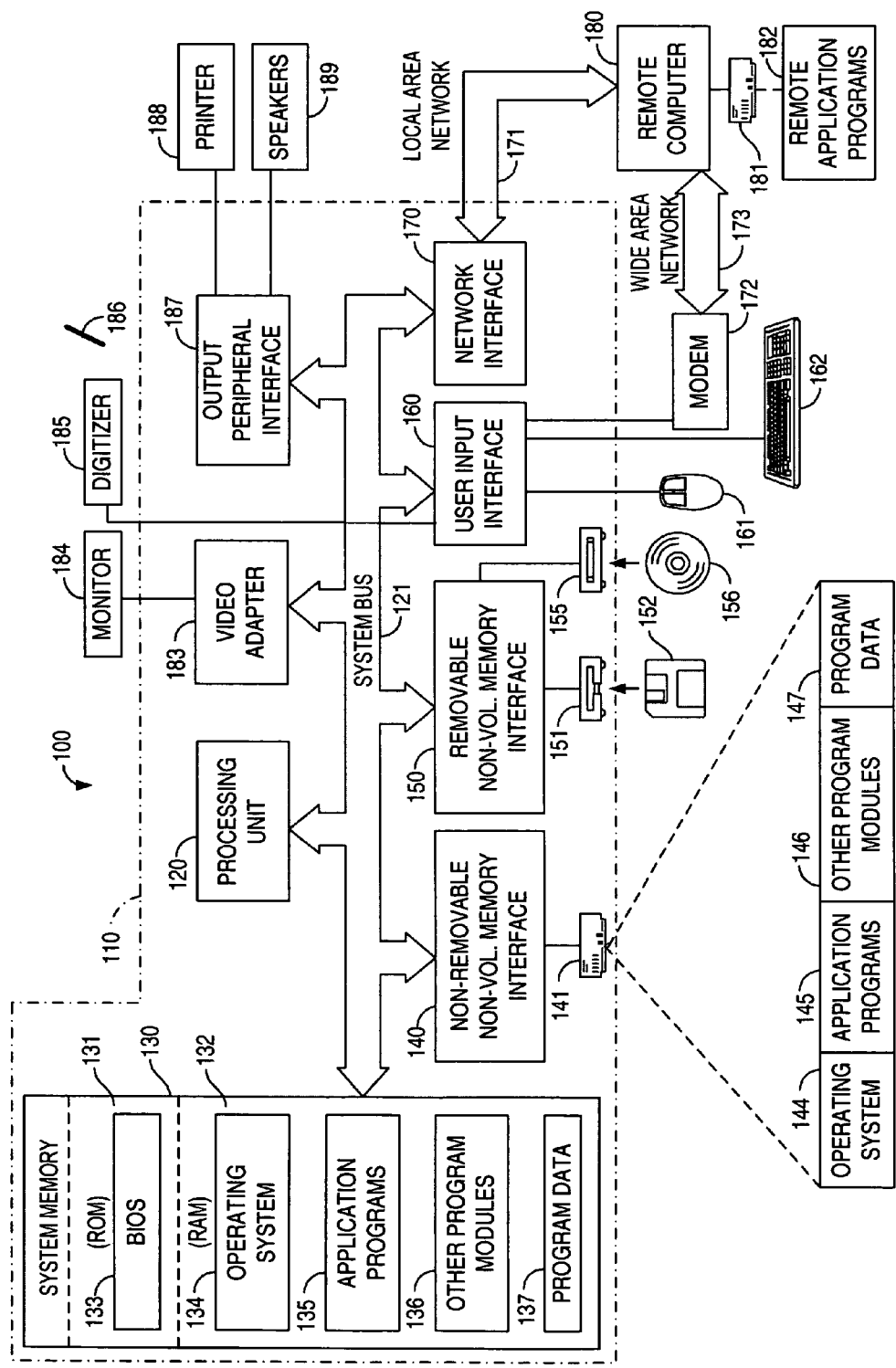
FIG. 1 illustrates an operating environment in which one or more illustrative aspects of the invention may be performed.
Figure 2:
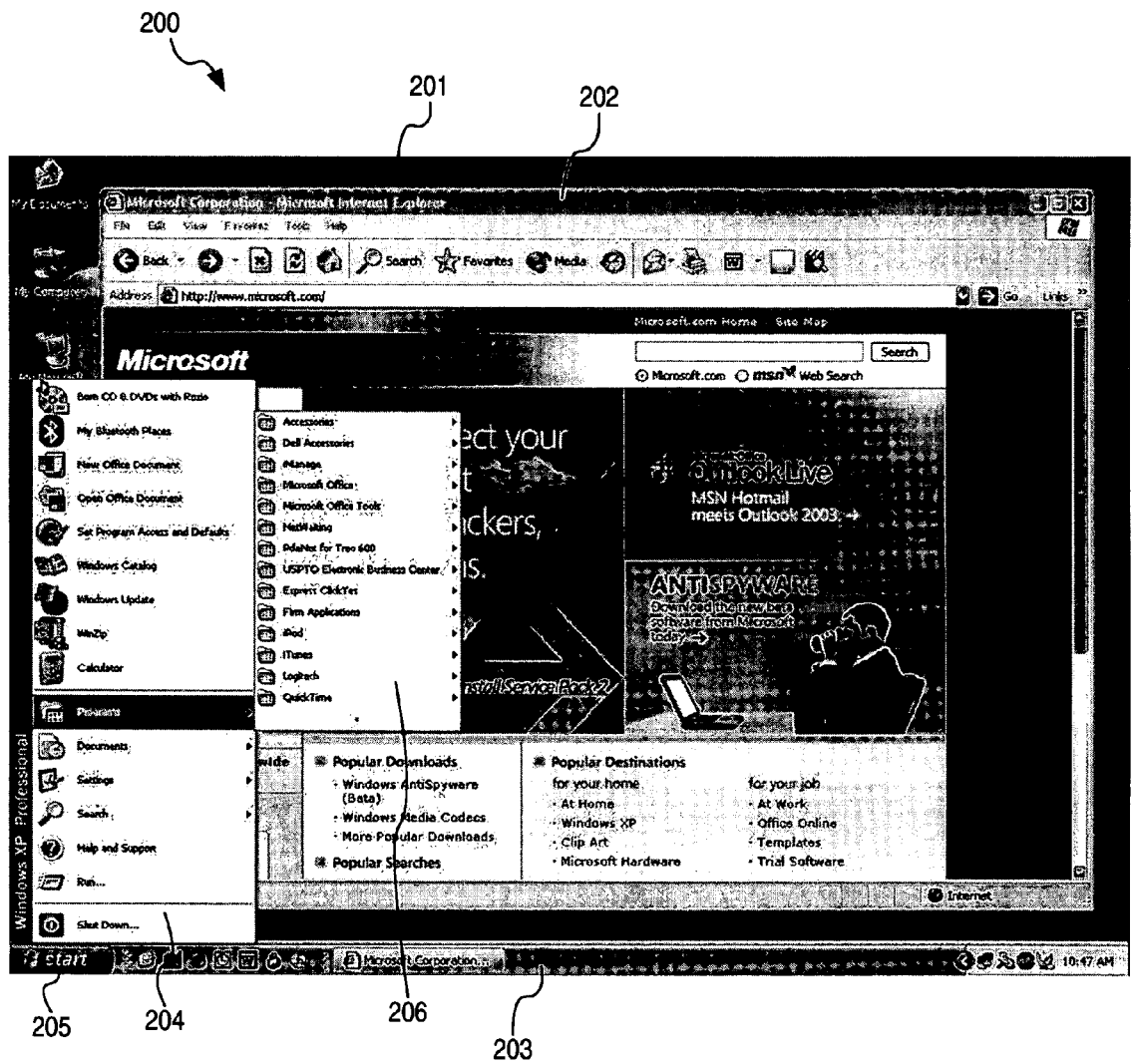
FIG. 2 illustrates a screenshot of a prior art desktop and program launch menu.

FIG. 1 illustrates an example of a suitable computing environment 100 in which the invention may be implemented. The computing environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; game consoles; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVD, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, universal serial bus (USB), or IEEE 1394 serial bus (FireWire). At least one monitor 184 or other type of display device may also be connected to the system bus 121 via an interface, such as a video adapter 183. The video adapter 183 may support advanced 3D graphics capabilities, in addition to having its own specialized processor and memory. Computer 110 may also include a digitizer 185 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments

Figure 3:
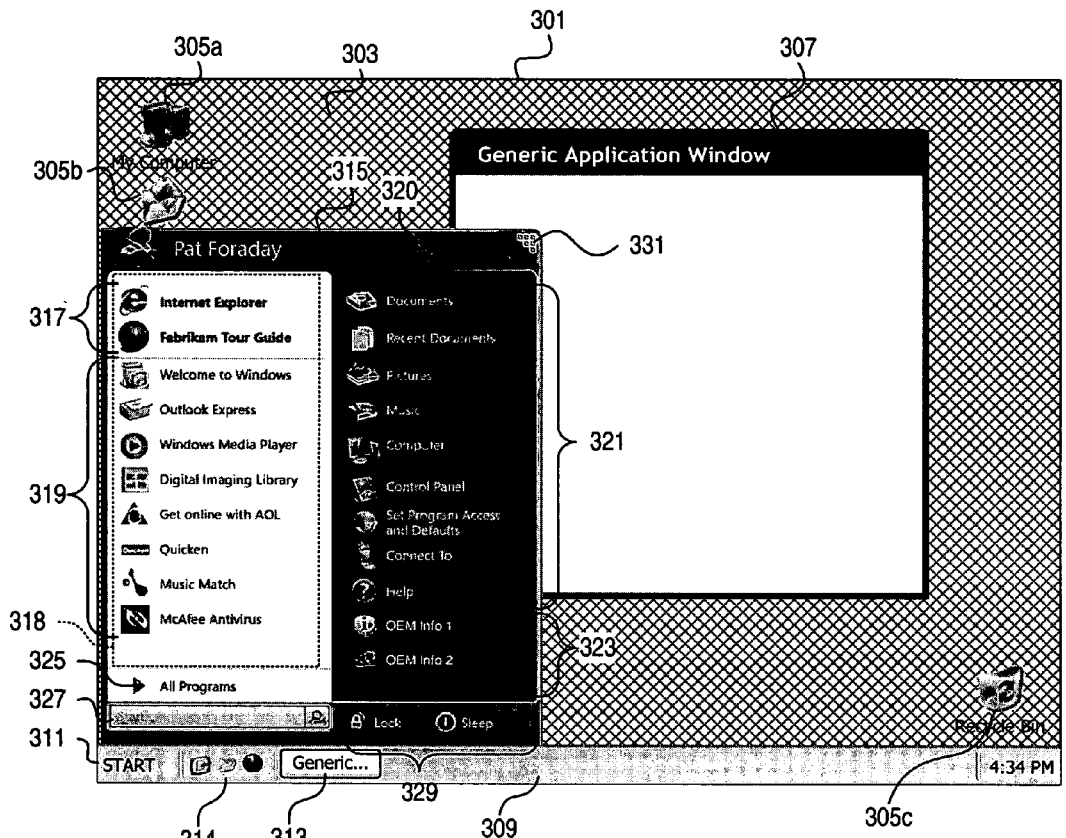
FIG. 3 illustrates a screenshot of a desktop having a program launch menu according to one or more illustrative aspects of the invention.

FIG. 3 illustrates a sample screenshot 301 according to an illustrative embodiment of the invention. The screenshot in FIG. 3 displays desktop 303, bordered on one side by taskbar 309, and featuring open window 307. Desktop 303 may include other elements including icons 305a, 305b, 305c representative of applications, storage locations, or other launchable and/or navigable items. Taskbar 309 may include additional elements including application button 313 corresponding to open window 307, and quick launch area 314.

When a user desires to launch a new application, the user moves a pointer (also referred to as a cursor) controlled by a mouse, trackball, or the like and clicks on the appropriate menu item in the launch menu 315 (also referred to herein as the Start Menu), which is itself first invoked by clicking on the Start button 311. The Start menu may alternatively be launched by a user pressing a special key on the attached keyboard 162, e.g., a Windows® key (not shown). The Start button 311 is generally located in a fixed location on the taskbar 309. A user may adjust the location of the taskbar 309, but once in place, the Start button 311 becomes a constant and familiar starting point for the user to launch new applications.

When a user clicks on the Start button 311 in FIG. 3, the Start menu 315 appears as a floating list on top of the currently open window 307 and desktop 303. Start menu 315 may include multiple regions or areas in which different items, icons, information and/or options are presented to the user. An item may refer to an application program, a storage location, a data file, a navigable URL, or any other selectable or actionable data reference. According to one or more illustrative aspects of the invention, the operating system may be adapted to provide enhanced organization and search capabilities within the Start menu 315. Start menu 315 may include a first region 317 storing pinned items, also referred to as pin list 317. A pinned item is one which remains in a fixed location on Start menu 315 regardless of actions taken by the user with respect to selecting and/or launching other items. By default, the pin list 317 may be pre-populated with a collection of operating system and original equipment manufacturer (OEM) items. A user, however, has control over the content of the pin list 317 and can add, remove, and reorder items in pin list 317, e.g., using drag and drop techniques. If a user drags an item out of pin list 317, the operating system may confirm with the user via a dialog box that the user indeed wants to unpin the dragged item, to ensure that the item was not accidentally dragged off the pin list 317. According to some aspects of the invention, items may be pinned/unpinned via a context menu, which is itself presented upon a secondary input received from an input device, e.g., "right-clicking" a computer mouse on an item. Items pinned via a context menu may, by default, appear at the bottom of pin lint 317.

Start menu 315 may include a second region 318 presenting a dynamic list of items according to various criteria according to one or more illustrative aspects of the present invention. In FIG. 3, region 318 represents a most commonly used (MCU) list of items 319, also referred to herein as MCU list 319. The operation and content of MCU list 319 is described further, below. Region 318 may also include the pin list 317.

Start menu 315 may include a third region 320 listing commonly used items, e.g., primary storage locations, help information, configuration items and the like. Region 320 may also be referred to herein as quick link list 320 or quick links 320. Quick link list 320 may optionally be divided into two or more subregions 321, 323 to distinguish between operating system defined quick links 321 and OEM quick links 323. The quick link list 320 may include visual separators between subregions 321, 323, and even between individual items or groups of items within each subregion, to visually distinguish groups of items. As with pin list 317, a user may control the contents of quick link list 320, e.g., through a control panel of the operating system (not shown).

Start menu 315 may further include a view selection button or control 325, allowing a user to select the view to be dynamically displayed in region 318. Button 325 may behave similar to a drop down or pop up list. The Start menu 315 may provide views including MCU List 319, All Programs view 401 (FIG. 4), Search Results view 501 (FIG. 5), and Run List view 601 (FIG. 6), each described in more detail below. According to an illustrative aspect of the invention, the default view may be MCU list view 319, or any of the other views provided by the operating system in region 318. Not all views may be listed through view control 325, and instead may be accessible based on input by a user. Start menu 315 may also include search box 327, and system controls 329 (e.g., to shut down the computer, hibernate, restart, or provide access to other system options). Start menu 315 may also be resizable via resize control 331. A user may resize the Start menu 315 using control 331 in order to control how many search results to display (search results are further described below) by controlling window height, and by controlling the length of displayed filenames and item names displayed before truncation by controlling window width.

Figure 7:
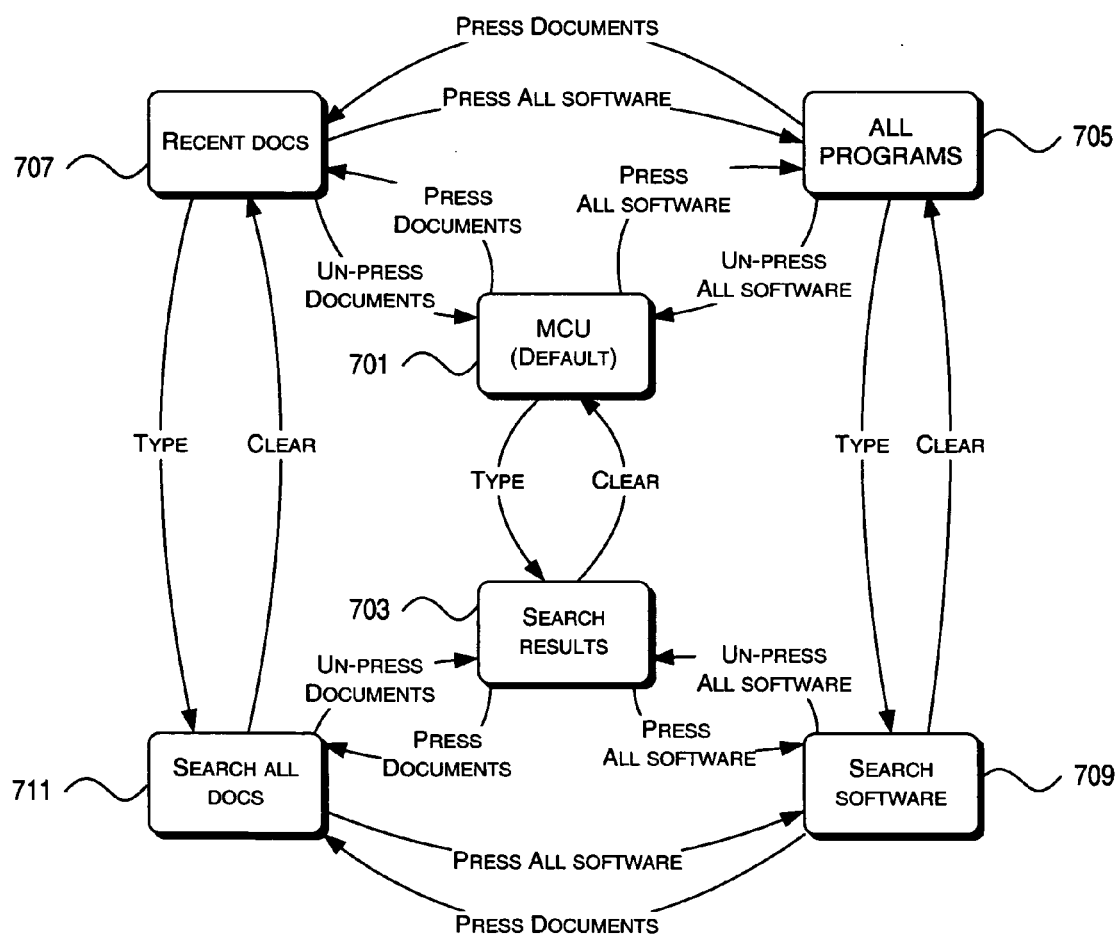
FIG. 7 illustrates a state diagram for use with a program launch menu according to one or more illustrative aspects of the invention.

With further reference to FIG. 7, Start menu 315 may transition between various views depending on input by a user of the computer system. That is, depending on what the user is doing, the dynamic region 318 may display MCU list 319, All Programs 401, Search Results 501, Run List 601, or Recent Documents (not shown). View control 325 may act as a general control to switch between views. Where there are only two primary views (e.g., see description of FIG. 8 below), view control 325 may behave as a toggle between MCU list and All Programs view, without displaying a drop down or pop up list. In addition, typing into the search box 327 automatically may navigate to the search results view corresponding to the view that was displayed upon entry of the text (e.g., programs, documents, all, etc.). Similarly, clearing the search box may navigate back to the previous view. Pressing a navigation control, such as <Esc> or <Backspace> may also return to the previous view.

FIG. 7 illustrates a state diagram for the dynamic region 318 of Start menu 315. In an illustrative embodiment, a default state 701 presents MCU list 319 and pin list 317 in dynamic region 318. From state 701, upon entering text in search box 327, the Start menu dynamically transitions to state 703 and search results view 501 is presented in region 318. From state 703, if the user clears the text in search box 327, the Start menu returns to state 701. From state 701, if the user selects All Programs from button 325 then Start menu 315 transitions to state 705 in which a listing 401 of all available programs and/or software (e.g., including documents or primary storage areas) is displayed in region 318. From state 701, if the user selects Recent Documents view (e.g., from button 325 or from the quick link list 320) then Start menu 315 transitions to state 707 in which a listing of recently used documents (as opposed to documents and programs) may be displayed in region 318. From either state 705 or 707, the user may select MCU list view from button 325 to return to state 701.

From state 703, if the user selects Recent Documents then the Start menu 315 transitions to state 711, which effectively filters the already displayed search results to include only recently used documents. From state 707, if the user enters text in search box 327, then the Start menu 315 also transitions to state 711, displaying the appropriate search results as described herein. From state 711, if the user clears the text from search box 327 then Start menu 315 returns to state 707. From state 711, if the user selects MCU list from button 325 (i.e., de-selects All Documents) then Start menu returns to state 703. From state 711, if the user selects All Programs from button 325 then Start menu 315 transitions to state 709.

From state 703, if the user selects All Programs or clears the search box 327 then the Start menu 315 transitions to state 709, effectively filtering the search results to include only application programs, as opposed to all recently used items. From state 705, upon entering text in search box 327, Start menu 315 also transitions to state 709, displaying the appropriate search results as described herein. From state 709, if the user clears the text from search box 327 then Start menu 315 returns to state 705. From state 709, if the user selects MCU list from button 325 then Start menu returns to state 703. From state 709, if the user selects Recent Documents from button 325 or quick link list 320 then Start menu 315 transitions to state 711.

From state 705, the Start menu transitions to state 709 upon the user entering text in search box 327, and transitions to state 707 upon the user selecting Recent Documents. The Start menu may return to state 705 from state 707 upon the user selecting All Programs.

Figure 8:
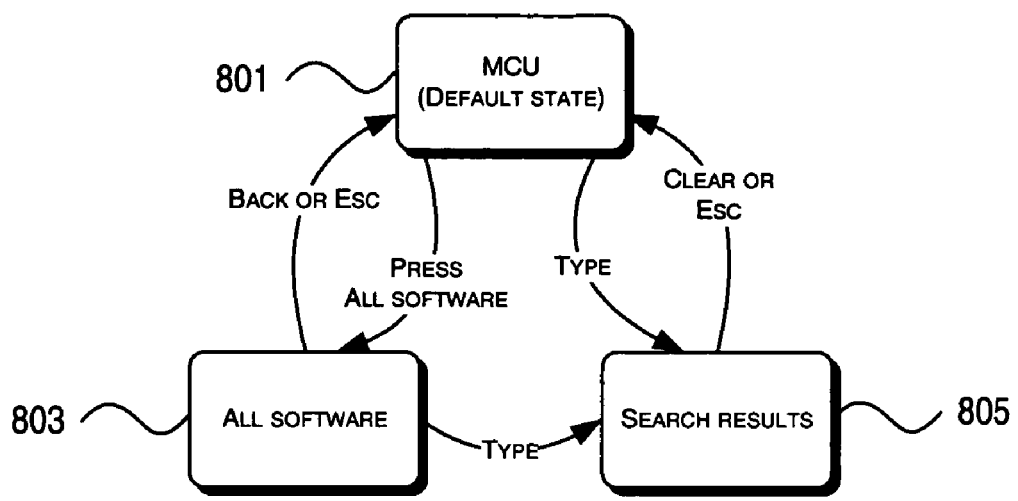
FIG. 8 illustrates an alternative state diagram for use with a program launch menu according to one or more illustrative aspects of the invention.

Those of skill in the art will appreciate that different state transitions may be used, some states may be optional, and additional states may be added. For example, FIG. 8 illustrates a state diagram for another illustrative embodiment having a reduced set of allowable states, namely, based on a removal of the Recent Documents view. From default state 801, Start menu 315 transitions to state 803 upon the user selecting All Programs from selection button 325. Start menu 315 transitions from state 801 to 805 upon the user entering text in search box 327.

Figure 4:
FIG. 4 illustrates a program launch menu according to one or more illustrative aspects of the invention.

From state 803, Start menu 315 may transition back to state 801 upon the user selecting MCU list from button 325 (or selecting "Back" as illustrated in FIG. 4), or upon the user selecting a navigation control such as <Backspace> or <Esc>. From state 803, Start menu 315 transitions to state 805 upon the user entering text in search box 327, in which state the appropriate search results are presented as described herein. From state 805, Start menu 315 may transition back to default state 801 upon clearing the search text from search box 327. While the state diagram of FIG. 8, illustrates only a single search results state (state 805), separate states may optionally be used to display search results based on searches initiated from states 801 and 803, similar to states 703 and 709 of FIG. 7. Modifications and/or variations may also or alternatively be used. For example, when a user selects the All Programs view in either of the above state diagrams, the Start menu 315 may automatically resize the height of Start menu 315 to a maximum possible height within desktop 303. The Start menu may retain the maximum height until the user resizes the Start menu 315 (using control 331), or the Start menu 315 may revert back to a previous height when the state transitions out of the All Programs view.

According to an aspect of the invention, transitions may be automatic at the time the user enters input (e.g., entering text in search box 327) or performs an action (e.g., selecting a view from button 325). As described herein, operating system 134, 144 may control operation of Start menu 315. Thus, as described above, when Start menu 315 transitions from one state to another, it does so under control of the operating system 134, 144, or some other software program. That is, operating system 134, 144 may dynamically update Start menu 315 in real time as the user interacts with the computer system 100.

The operating system may provide various settings detailing the views that may be available in the Start menu 315. For example, a user may disable application tracking (i.e., monitoring when and how often an item is selected or launched), thereby eliminating the MCU list view, and the All Programs view becomes the default view. If a control setting to "open submenus when I pause on them with my mouse" is selected, then the user need only hover the cursor or mouse pointer on the view control 325 (or back button if displayed) to switch views. Each of the various views presented in the various states will now be described in more detail below.

Most Commonly Used List View

Referring back to FIG. 3, region 318 displays most commonly used (MCU) list 319 and pin list 321. MCU list 319 may include a predefined number of recently used or frequently used items, e.g., as might be included in an MRU and/or MFU list. The specific number of items in MCU list 319 may be preset by the operating system, and/or may be modified by a user. Start menu 315 may be resized automatically based on the number of items in MCU list 319 or in any other region. MCU list 319 preferably does not shrink when only a few items are utilized. Instead, an MCU algorithm may determine which items to include in MCU list 319 based on usage points, and then based on usage dates to break any usage point ties. According to an illustrative aspect of the invention, the last selected item or launched application always appears in the MCU list 319, e.g., by always being given the same or more usage points than the lowest ranked item presently in the MCU list. The MCU algorithm is explained in more detail below.

The operating system and/or user may place items on the pin list 317 in order to ensure that specific items are always displayed on the Start menu 315, regardless of their use. The pinned list may be populated with default items, for example, a browser such as Microsoft's Internet Explorer® brand web browser, and an OEM selected item. However, a user may modify the pin list, e.g., using a context menu of pinnable items and/or using drag-and-drop selection techniques.

The MCU algorithm addresses various shortcomings of previously used MFU or most recently used (MRU) algorithms. Namely, a MFU list does not always include recently used functionality. That is, a recently used application might not appear on a MFU list where that recently used application is used very infrequently, or only recently became a preferred application of a user. Similarly, previous algorithms do not ensure that the last launched application is on the MFU list.

Thus, according to an aspect of the present invention, an improved MCU algorithm is used to determine which items are placed on MCU list 319. The MCU algorithm determines which items to place on the MCU list based on an awarded number of usage points. The higher an item's usage points, the higher the item may be placed on MCU list 319. When two items have the same number of usage points, then the item with the later last-use or edit timestamp may receive precedence.

Initially each item on computer 110 or computing environment 100 which could be placed as a list item in MCU list 319 begins with the same number of usage points, e.g., zero. However, in order to populate the MCU list with a default set of items, the operating system may provide to one or more items a timestamp that is later than other items. For example, a "Welcome to Windows" tutorial program, an email client such as Outlook® Express, Windows Media Player®, and a digital imaging library might be initialized with a timestamp that is one minute later than other documents or applications stored on computer 100. Alternatively or in combination with the timestamp, default items may be initialized with a certain number of usage points to ensure their default placement on the MCU list 319. For example, the "Welcome to Windows" tutorial program, the email client such as Outlook® Express, Windows Media Player®, and the digital imaging library may be initialized with 19, 18, 17, and 16 points, respectively, which also ensures their order of placement on the MCU list. The operating system 134, 144 or other control software may reserve one or more default list positions for OEM items, which may also receive a timestamp and/or usage points to guarantee their initial placement on MCU list 319. For example, in one illustrative embodiment, four OEM items receive 15, 14, 13, and 12 initial usage points, respectively.

Whether an item remains on MCU list 319, is added to MCU list 319, or is removed from MCU list 319 subsequent to the initial default determination depends on each item's subsequent use by one or more users of computer system. Generally, when a user selects or launches an item, usage points are added to that item; when items go unused for specified periods of time, usage points are subtracted from that item. When a user selects the start button 311, the operating system 134, 144 populates MCU list 319 with a predetermined number of items having the most usage points, breaking ties based on timestamps as described above. Various methods and algorithms may be used to calculate usage points per item, and those of skill in the art will appreciate that the specific algorithm used is secondary to the results it produces, as described herein. The algorithm described below, and implemented in computer system, is but merely an example of an algorithm that may be used, and is not intended to limit the scope of the appended claims.

Figure 9:
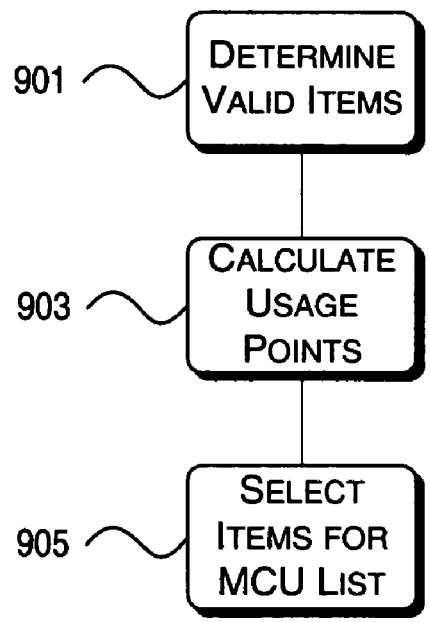
FIG. 9 illustrates a method for determining valid items for inclusion on a most frequently used list according to one or more illustrative aspects of the invention.

FIG. 9 illustrates a general MCU algorithm that may be used according to an illustrative embodiment of the invention. Initially in step 901, operating system 134, 144 calculates the number of usage points associated with each valid item. As used herein, a valid item is any item that could be placed on MCU list 319, regardless of whether the valid item is presently placed on the MCU list. Valid items may be defined as any launchable application, storage location, navigable URL, etc., or may be more limited, e.g., to only launchable applications.

In one illustrative embodiment, valid items may be limited to folders or files ending in .exe, .msc, or .scf, and that are not listed in an operating system registry under HKLM\Software\\Microsoft\Windows\CurrentVersion\Explorer\FileAssociations\AddRemoveApps, and that do not have a NoStartMenu or NoStartPage Boolean flag set under the application key in HKCR\Applications\, and/or are not listed in a stored "kill list" of applications that should never appear on the MCU list. Even if an application or item does not meet the aforementioned test, an application may still be a valid item if it has a StartMenu value under the application key in HKCR\Applications\ in the operating system registry, thus providing an explicit mechanism so that an application used only infrequently appears as a valid item.

Once the list of valid items has been determined, the operating system 134, 144 in step 903 calculates the number of usage points per valid item. Usage points increase when a valid item is selected, and usage points decay during periods of non-use of a valid item. In one illustrative embodiment, the first time a valid item is selected, the operating system assigns the selected valid item a usage point count to be the greater of a predetermined value, e.g., six (6), or the smallest number of usage points of any valid item currently eligible for display in the MCU list 319. Awarding the greater of the two values ensures that the most recently used item, even if not otherwise eligible for display on MCU list 319, is included in MCU list 319 the next time the operating system 134, 144 generates and/or populates MCU list 319.

Each additional time the valid item is selected, either directly or via a shortcut or link (e.g., through the Start menu search view, All Programs view, MCU list, etc.), the valid item's usage points may be incremented by at least a predetermined number of usage points, e.g., 1, 2, 6, etc., again adding at least enough usage points to ensure the item is included in the MCU list. When a valid item is selected via a shortcut or link, the usage points of both the valid item and the shortcut or link may be incremented. According to alternative possible embodiments, usage points may be incremented more or less based on additional factors, such as based on the item type (e.g., application programs increment by a predetermined number; documents increment by ½ of the predetermined number; URLs increment by ¼ of the predetermined number; etc.), item location (e.g., local items increment by 1; remote items increment by ½; etc.), and the like.

Usage point decay may be based on any algorithm that decreases usage points based on a general lack of use of a valid item over some measurement of time. Usage point decay may be based on a number of elapsed sessions during which a valid item has not been used. A session may be any predefined amount of time or other calculable period. For example, in one illustrative embodiment, a session counter increments at each user login, and once every H hours of use of the computer system. The value H=12 has been found to work well. "Use" of the computer system may be defined in a variety of ways. Preferably, "use" is defined as any use of computer 110 during an amount of time H. Thus, when a user interacts with the computer system, the operating system sets a "Use" flag=true. At the end of the H-hour period from login (or at the end of H hours from when the "Use" flag was set), the operating system increments the session counter, resets the "Use" flag=false, and resets the H-hour timeclock.

For example, if a user goes on vacation for a week and leaves his or her computer on, no sessions will lapse because the computer has not been used (one session might lapse, however, for the initial login of the user). On the other hand, if the user leaves his or her work computer on for a week while the user is at work using the computer, generally one session will increment per day, assuming the user works less than H-hours/day. Those of skill in the art will appreciate that other values for H may be used.

Once the operating system (or other control software) determines how many sessions have lapsed without a specific valid item being selected or run, the operating system may decrement the usage points of that specific valid item using a decay factor based on the number of elapsed sessions. In one illustrative embodiment, the decay factor and/or values may be:

| Elapsed Sessions | Decay |
| --- | --- |
| 3 | Subtract 1 |
| 6 | Subtract 1 |
| 9 | Subtract 1 |
| 12 | Subtract the greater of 25% or 2 |
| 17 | Subtract the greater of 25% or 3 |
| 23 | Subtract the greater of 50% or 4 |
| 29 | Subtract the greater of 75% or 5 |
| 31 | Reduce usage points to 0. |

Those of skill in the art will appreciate that different numbers of elapsed sessions may be used to trigger usage point decay, and different usage point decay factors and/or values may alternatively be used.

In one embodiment, a valid item's usage points may be calculated as the cumulative total of the usage points corresponding to the valid item in addition to the usage points of any shortcuts or links pointing to the valid item. The most recent runtime timestamp of the valid item and any shortcuts or links to the valid item is used for purposes of breaking ties as described herein.

In step 905, operating system 134, 144 selects N valid items having the highest usage point values to populate MCU list 319, where N is a number of slots in MCU list 319 and is set by the operating system 134, 144 (e.g., based on space allotted to the MCU list on the display screen) and/or may be defined by a user. Operating system 134, 144 may optionally filter out valid items from the MCU list where the valid item is otherwise already included in Start menu 315, e.g., in pin list 317 or in quick link list 320.

As discussed above, a kill list may be used to prevent certain items from appearing on Start menu 315. For example, setup programs, documentation, uninstallation programs, and virus scanners typically do not need to appear on MCU list 319. In some embodiments the kill list may include phrases that, when present, prohibit an item from being included in the set of valid items. For example, the following phrases, with or without regard to capitalization, may be used as an illustrative kill list: Documentation; Help; Install; More Info; Readme; Read Me; Read First; Setup; Support; What's New; Remove. Other embodiments may identify specific applications in the kill list. For example, the following applications may be prevented from inclusion on MCU list 319: setup.exe; install.exe; isuninst.exe; unwise.exe; unwise32.exe; st5unst.exe; rundll32.exe; msoobe.exe; 1nkstub.exe; inoculan.exe; realmon.exe; navwnt.exe; explorer.exe; sndvol32.exe; icwconnl.exe; and mobsync.exe. These programs are illustrative only of the fact that specific applications may be precluded from inclusion on the MCU list, and do not limit those application programs which can be precluded from inclusion on the MCU list, as desired.

Combinations of phrases and specific applications may also be used. Those of skill in the art will appreciate that the above-described algorithm, including assignment of usage points and decay of the same, may be used in any MFU/MRU/MCU list algorithm, and is not limited to use in a Start menu or program launch menu. Any historical list of items may use a population algorithm as described herein, e.g., a history list of a web browser, recently played audio and/or video files by a media player, etc.

All Programs View

When a user selects view control 325 as illustrated in FIG. 3 to switch to All Programs view (i.e., the view control 325 identifies the option to switch to All Programs view, or the user selects All Programs from a pop up list as a result of selecting view control 325), Start menu 315 transitions to the All Programs view illustrated in FIG. 4. In FIG. 4, Start menu 315, in dynamic region 318, displays a list 401 of all available executable applications and/or primary storage locations. List 401 is preferably displayed in alphabetical order to simplify a user's ability to visually scan list 401 to find a desired item. In one illustrative embodiment (not shown), a user can pin items in a specific location on list 401, e.g., at the top of the list, similar to pinning items in the MCU view illustrated in FIG. 3.

In some instances the computer system stores many applications programs and storage locations, and navigation of all items may be cumbersome. In order to simplify a user's ability to navigate list 401, a user can scroll up or down list 401 using a scroll bar as illustrated in FIG. 4, or using the scroll wheel of an input device (such as a mouse) while the cursor is over list 401.

Figure 12:
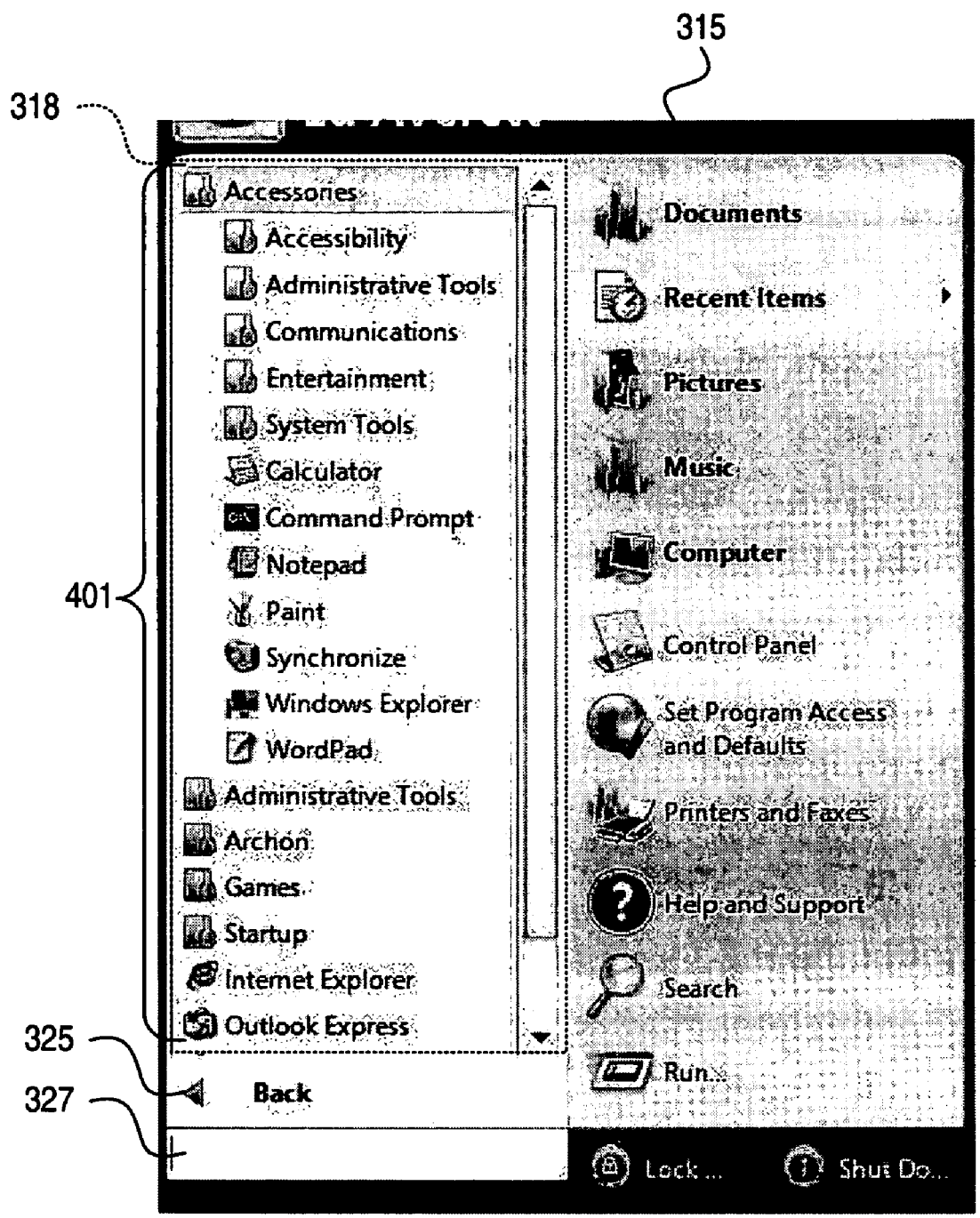
FIG. 12 illustrates a screen shot of a program launch menu displaying All Programs according to an illustrative aspect of the invention.

To further simplify the user's navigation of list 401, the Start menu 315 may present list 401 in a hosted tree view so that users can easily expand and collapse menus and submenus. In one embodiment, such as illustrated in FIG. 12, when a user either single or double clicks on an item in list 401, if the item is expandable, the Start menu expands the list to display the items underneath the initially selected item, such as is shown in FIG. 12. In FIG. 12, a user has selected an 'Accessories' list item, in response to which the Start menu 315 expands list 401 to display the sub-hierarchical items under 'Accessories,' including, e.g., Accessibility, Administrative Tools, Communications, Entertainment, System Tools, Calculator, Command Prompt, Notepad, Paint, Synchronize, Windows Explorer, and Wordpad. The user may select 'Accessories' a second time to collapse the submenu of items.

In an alternative illustrative embodiment, the Start menu 315 may present list 401 in a hosted tree view so that users can easily expand and collapse menus and submenus using recognizable '+' and '−' controls. When a user selects a '+' control, the Start menu 315 expands the storage location to which the selected control corresponds to display items stored in that storage location, and the control changes to '−'. If the user selects the '−' control, then the Start menu 315 collapses the storage location to which the selected control corresponds to hide the items stored in that storage location. FIG. 10 illustrates a sample All Programs menu hierarchy that may be used in combination with or alternatively to the top-level hierarchy illustrated in FIG. 4. FIG. 11A and FIG. 11B, collectively referred to as FIG. 11, together illustrate an alternative, flatter, All Programs menu hierarchy that may be used in combination with or alternatively to the top-level hierarchy illustrated in FIG. 4 and FIG. 10. A flatter hierarchy may be preferable where the space allotted to the list 401 is relatively narrow.

If a user selects an item in an expanded storage location, operating system 134, 144 launches the selected item, or the appropriate application to interact with the selected item, and closes Start menu 315. Upon reopening Start menu 315 and selecting the All Programs view, list 401 may appear completely collapsed, regardless of its prior state, or list 401 may appear in the same state as that in which the user last expanded or collapsed.

To emphasize newly installed applications to a user, Start menu 315 may highlight recently installed applications in list 401. Optionally, Start menu 315 may also automatically expand any items that necessarily must be expanded in order to see a highlighted newly installed application in list 401, and may also automatically scroll list 401 to the highlighted newly installed application.

Using a hosted tree view as described above allows a user to more intuitively navigate a hierarchy of Start menu items without accidentally opening undesired submenus by simply hovering over an item for too long. In addition, the hosted tree view described above allows a user to navigate hierarchical items in the Start menu without covering up as much desktop real estate than was previously needed, thus allowing the user to view more open windows or folders on the desktop simultaneous to navigating the Start menu.

Search View

Figure 5:
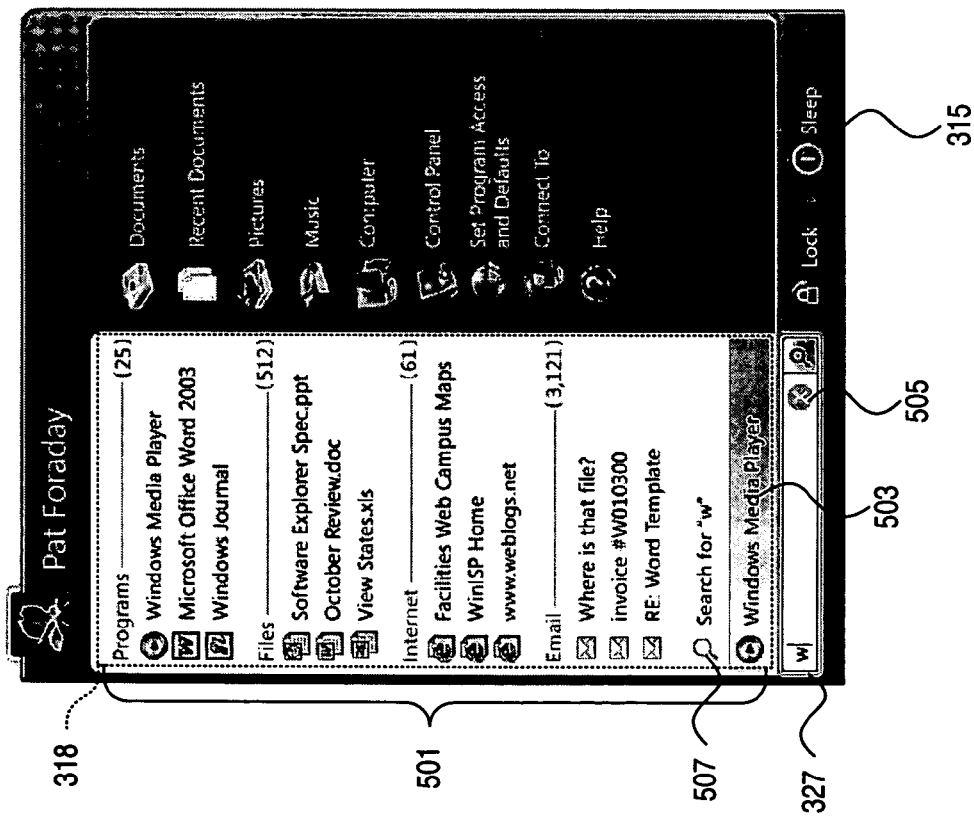
FIG. 5 illustrates a program launch menu according to one or more illustrative aspects of the invention.

From any view, e.g., the MCU view illustrated in FIG. 3 or the All Programs view illustrated in FIG. 4, the user can type text into search box 327 to search for Start menu items. Upon entering text in search box 327, Start menu 315 automatically switches to a Search Results view 501, such as is illustrated in FIG. 5, displaying results that match text as it has been entered thus far by the user. That is, from search box 327, a user can perform a character by character search across the programs, user files, Internet links, and communications on his or her system. As the user enters text in the search box 327, the computer system searches for the entered text, as further described below. The system may wait until the user pauses typing before displaying search results, or the system may initiate a new search with the entry of each additional character by the user.

The Start menu 315, under control of the operating system 134, 144 or other control software (where Start menu 315 performs some action herein, it is understood to be under the control of operating system 134, 144 or other control software), may use any built in or known search engine to perform searches on computer system 100. The search engine preferably searches the file system of the computer 110, as well as URLs and executables in the user's Path. The search service may also include search results from other data providers, such as web search results from a web search engine, photo results from a photo website such as Picasa, music results from a service such as MSN music, or any combination of these and/or other data providers. The search engine may index all searchable locations in order to expedite searching.

In addition, the search engine may use a variety of data sources and/or data providers, each of which is not required to be a "search" provider. The search engine, for certain types of data, may automatically retrieve all relevant information from a data store regarding a type of data or files being searched, and then filter the information to find search results based on the search criteria. The data store does not thereby perform a search, it just provides the relevant information for the search engine to search/filter accordingly. By using multiple data providers at once, the search engine can use different providers for different types of search results (for example, one provider for programs, one provider for email, etc.), or the search engine may use the same type of provider running on different machines on a network to get results from different computers (for example, to find files on all the computers on a local network). Each data provider may be a built-in data provider resident on the computer system, or a remote trusted source connectable via a network, such as a remote data provider or a third-party data provider.

The search results view 501 preferably groups results according to result type, although this is not required. In one illustrative embodiment the following groups are used: programs (executable), files (non-executable), Internet (URLs), and communications (any file perceived as a communication, e.g., email, IM logs, etc.). In some embodiments, a user may select which category/-ies is/are shown in the search results. For example, a user might exclude Internet search results and include email results, depending on personal preferences. Due to the amount of time that is sometimes required in order to perform a search, search results may be displayed in a two-step process. In step 1, while the search is ongoing, each of the four groups receives the same amount of allotted space in the search results view 501. This may be computed by dividing the total amount of space by the number of groups, and extra space may be allotted from top to bottom. As the search engine identifies results during step 1, the Start menu 315 displays the results in the appropriate group. Preferably, a result is not shown unless it is impossible for the result to be replaced later by a better result of the same type. The search engine can ensure that a result cannot be replaced by searching data providers in their priority order. For example, if application programs always have precedence over all other types of files, then once the search engine has finished searching through the programs files and/or folders, the search engine can show all application programs results, even if it has not finished searching through other folders, because no matter what the search engine identifies in the other folders, they will not get a higher priority placement in the search results than the found application programs. However, any result may be displayed when the result is identified if desired.

Step 2 begins when the search engine has completed its search. In step 2, the Start menu 315 redistributes the allotted space in search results view 501 by removing groups with no results and redistributing the space to groups having results. The space may be redistributed evenly among the remaining groups, or may be allotted proportionately based on how many results each group has. Also, allotted space may be reduced based on a group only having a small number of search results. For example, if a group only has two results, and the allotted space would otherwise be large enough to display three results, then Start menu 315 might allot enough space to that group to display just its two result items.

Start menu 315 may determine which items to display for each group in a variety of manners. For example, in FIG. 5, the user has only typed the letter 'w,' which matches many results in each category. Thus Start menu 315 (or the search engine) must necessarily decide the order in which to display results equally matching the user-entered text. In a first illustrative embodiment, Start menu 315 may present n matching items in order of their modification date, from the present date and/or time proceeding backwards, where n is based on the amount of space allotted to the group in which the items are displayed. In another illustrative embodiment, Start menu 315 may display any items first where the item's name begins with text matching the user-entered text, second where the item has a word other than its starting word that starts with text matching the user-entered text, and third where the item has any text matching the user-entered text.

In another alternative embodiment, Start menu 315 may rank otherwise equally matching items according to other predefined criteria, such as whether the match was based on information associated with the item (e.g., meta data), information in the item (e.g., full text search), a storage location of the item, information associated with the storage location of the item (e.g., if two items are both identified in a URL history folder, then the most recently visited item may receive precedence over the other item). In an illustrative embodiment the ranking and tie-breaking rules of FIG. 13 may be used. Thus, any item stored in the Start menu pin list 317 (FIG. 3) matching meta data information associated with the item, e.g., the item name, will be displayed above other items. If two or more items both match based on their inclusion in pin list 317, then the two items are ranked based on their order in pin list 317.

Those of skill in the art will appreciate that additional or alternative tie-breaking and sort rules may be used, and that the rules illustrated in FIG. 13 are but one example of possible ordering and tie-breaking rules.

When displaying search results, the Start menu 315 may display in bold, italics, or otherwise (not shown), a pertinent part of an item's name that caused the item to match the user-entered text. The Start menu 315, when a user hovers the cursor over a search result item, may display the meta data that caused the item to match the user entered text. Additionally, the search results view 501 may include an identification of the number of matching items in each group (e.g., 25 matching Programs, 512 matching Files, 61 matching Internet URLs, and 3,121 matching Communications in the present example). During step 1, while the search is underway, instead of displaying the number of matching items, the search results view may display "searching." Once the number of matching items is displayed, the user may select the group name or number of matching items to navigate to a separate search window (not shown) listing only results within the selected category.

If there are no results, the search results view may display a no results icon or error message, or may simply display a top match of "search for <foo>," where <foo> is the text entered by the user. Upon selection of "search for <foo>," the computer system 100 may initiate a broader search for the user-entered text, e.g., by launching a full-text search or full-text search window. In the full text search, the user may be able to search the computer for <foo>, search the Internet for <foo>, and/or search some other computer or database for <foo>, regardless of where the text <foo> appears.

According to an illustrative aspect of the invention, the user may easily launch a search result item by clicking the item, or by simply pressing <Enter> if the desired search result item has the selection focus. By default, the search results view 501 highlights the top match 503. Thus, if the user wants to launch the top match, the user may simply press <Enter>. Because there is a group top match for each displayed group, the search engine or Start menu must determine the global top match from all the group top matches. That is, each search can only have one top match. The operating system 134, 144 launches the top match if the user presses <Enter>. The global top match may be based on similar rules as the tie-breaking and ordering rules in FIG. 13, or using different rules, e.g., those illustrated in FIG. 14. The rules in FIG. 14 incorporate rules not included in FIG. 13, e.g., whether a search result item is also associated with a keyboard shortcut, whether a search result item is a URL, and whether a search result item has a first word that matches the search string. The top match is preferably chosen only after the search engine has determined that no item will replace it, i.e., all search results from higher priority locations have been identified.

In a computer system using a keyboard 162 having a <Windows> key and using the Start menu search box as described herein, a user can more easily launch items using a near indefinite number of keyboard shortcuts. That is, when the user presses the <Windows> key (not shown), the operating system displays the Start menu, and the search box 327 has input focus by default. The user can immediately start typing text for which he or she would like to search for an item. Thus, if the user types <Windows>, 'w', 'o', <Enter>, the operating system will launch the Microsoft® Word® brand word processor, if installed and if it is the top match. No mouse manipulation is necessary (although, certainly allowable if desired). By learning which searches produce desired results, users can learn many keyboard shortcuts to quickly launch desired items that are returned as the top match to the entered search string. Given the time and inclination, a user can learn keyboard shortcuts to launch most application programs and documents on his or her computer, without being required to previously manually link or set up a keyboard shortcut as corresponding to a specific file.

In some embodiment, certain keyboard accelerators may result in predefined search results, e.g., where the keyboard accelerator is used to launch an associated program. Thus, in a system where the key combination <Windows>-'c' launches the Control Panel, if the user enters 'c' in the search box 327, the top match will by default be the Control Panel, until the user enters additional text. Other common keyboard accelerators may include H-Help and Support, S-Search, R-Run, L-Log Off, and U-Shut Down. Additional or different keyboard accelerators may alternatively be used, or configured by a user.

Alternatively to launching the top item, the user can navigate to an alternate search result item using cursor keys, or single clicking on the alternate item, thereby highlighting the alternate item. Regardless of the presently highlighted search result item (top match or otherwise), the Start menu 315 applies any text input entered by the user, including <backspace> and the like, into search box 327, which is why the top match is said to have selection focus. The search box 327 and the currently selected match may be thought of as a combined item receiving input focus, with text input being directed to the search box 327 and selection input being directed to the currently selected match, but only the current selected match is highlighted.

Figure 6:
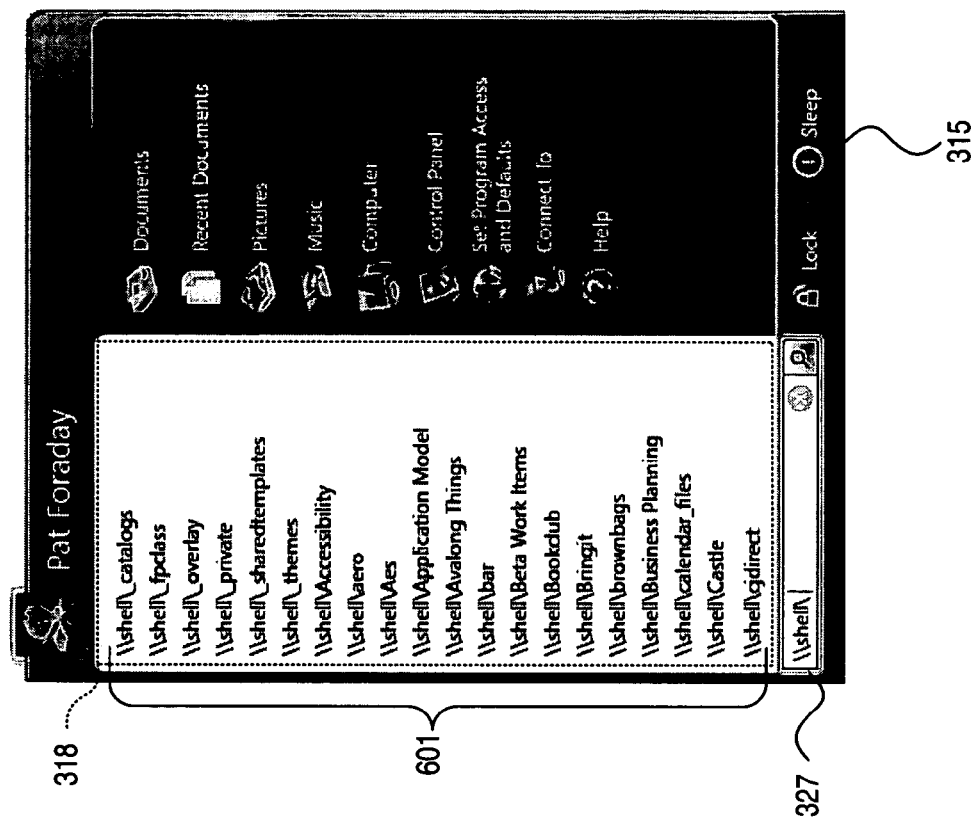
FIG. 6 illustrates a program launch menu according to one or more illustrative aspects of the invention.

According to an illustrative aspect of the invention, a user may restrict the searched locations, files, and/or file types using special input commands into search box 327. As illustrated in FIG. 6, a user can restrict the locations searched by preceding the text entered in search box 327 with an identifier of a storage location. Typing a storage location identifier may cause the Start menu 315 to replace the search results view 501 with auto-complete view 601, illustrated in FIG. 6. In this example, '\\' refers to a root directory of an intranet data network. Alternatively, the user may enter 'C:\' to specify a storage path based of the C: drive (other drives and/or storage locations may alternatively be specified). The location limiting identifiers 'http://' and/or 'www' may be used, for example, to limit results to a URL history or other URL list. When the user enters a location-limiting identifier, Start menu 315 may display search results 601 using a look-ahead or auto-complete view as illustrated in FIG. 6. That is, each result listed in list 601 matches the user-entered text in search box 327. A user can either enter more text to further limit the results, or scroll up to a desired search result and hit enter to launch the selected item. Using the look-ahead feature in combination with the start menu search box 327 allows a user to run any file without being required to navigate to a Start|Run option as was required by previous operating systems.

If the text entered into search box 327 is a command known to the operating system 134, 144 or computer 110, the Start menu 315 may display the command as a primary match result in some emphasized form, e.g., bold, first, top of list, bottom of list, nearest to selection focus location, etc., or as the top match. Known commands may be limited to commands found within a location defined by a Path variable of the computer 110.

According to an aspect of the invention, the user may enter command line variables in search box 327 which are then input when the selected command is run or launched. For example, if a user types "ipconfig-release" in search box 327, the command "ipconfig" is presented as a match. Upon selection of the "ipconfig" result and pressing enter (or clicking, etc.), the computer automatically inserts "-release" as a command line parameter. Allowing users to specify command line parameters provides increased flexibility and precludes requiring that a user launch a Start|Run window or separate Command window in order to specify command line parameters when launching a file.

As illustrated in FIG. 5, when the search box 327 contains text, the search box 327 may also display an 'X' 505 which, upon selection by the user, clears any text from the search box 327. When the text box is cleared, e.g., by selecting the displayed 'X' 505, the Start menu returns to the previously displayed view, e.g., either the MCU view 319 or All Programs view 401. When the search box 327 is empty it may display default instructional text written in a reduced visibility manner, e.g., in gray, as illustrated in FIG. 3.

The Start menu 315 may display a context menu when the user makes a secondary selection (e.g., "right-clicking") within the search box 327. The context menu, in addition to providing known cut, copy and paste commands, may also display a predefined number of recent search strings, e.g., six (6). In an alternative embodiment, the context menu may instead display the names of the last six (or other number) of results that were launched, instead of the search string that found them.

Upon selection of the displayed magnifying glass 507 (or alternate icon), the operating system may open a new search window and display the search results in the newly opened window (not shown).

Keyboard shortcuts may be used to navigate the Start menu search results view 501, auto-complete view 601, or other views. For example, the <Esc> key may cause the search box 327 to clear any text and return to the previous view (e.g., MCU or All Programs); left and right cursor keys may move the cursor when text is present in the search box 327; up and down cursor keys may move the focus accordingly in the presently displayed view or list (e.g., view 319, 401, 501, 601); Ctrl-X, Ctrl-C, and Ctrl-V may cut, copy, and paste text in search box 327, respectively; the <Tab> key may move the input focus cyclically from the search box 327 to search results 501 to pin list 317 (when present) and back to the search box 327; when focus is in the search box 327, the <Enter> key launches the top match; when focus is out of the search box 327, the <Enter> key launches the selected item; Ctrl-Enter may launch a web browser to a location as defined by the search string, e.g., 'http://' followed by 'www.<SearchString>.com'; and when input focus is not in search box 327, typing a letter may cause the input focus to jump to an item starting with the typed letter, also referred to as Type-To mode.

According to an illustrative aspect of the invention, search box 327 may be placed outside the Start menu 315, e.g., in taskbar 309, in a sidebar, or floating on the desktop, and provide a mechanism to locate programs, files, and other items without navigating through Start menu 315. Search results and auto-complete results may be displayed in a resizable or nonresizable pop-up window presented above the search box 327. Upon selection of any search result, the selected item is launched and the pop-up window is removed. The results pop-up window may include a Close button for the user to close the pop-up window without selecting a search result. The pop-up window may also be closed when the input focus is on neither the search box 327 nor the results pop-up window.

CONCLUSION

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. One or more computer readable media storing computer executable instructions executing to cause a computer to provide a graphical user interface comprising:
   selection of a start button which, causes the computer to display a program launch menu,
   wherein the program launch menu comprises an initial display of a plurality of selectable items, each selectable item corresponding to an application program, and further comprising within a search text input box, and
   wherein the program launch menu comprises a predefined area for displaying search results of searches conducted from a user inputting text within the search text input box, wherein the search results comprise selectable items based on the user input;
   based on search text entered into the search text input box Subject matter wherein information is entered at a particular location.

2. The computer readable media of claim 1, wherein the computer executable instructions further cause the user interface to provide a selection focus to a first search result having a top relevance to the user input.

3. The computer readable media of claim 1, wherein the graphical user interface dynamically updates the search results based on each additional text character input by the user into the search text input interface without clearing contents of the search text input interface.

4. The computer readable media of claim 3, wherein the dynamic update comprises detecting that a predetermined amount of time has elapsed since a last received text input character.

5. The computer readable media of claim 1, wherein the graphical user interface displays the search results by arranging the search results into one or more groups according to a type of each matching selectable item.

6. The computer readable media of claim 5, wherein the groups comprise at least two groups from a set of groups comprising programs, files. Internet locations, and communications.

7. The computer readable media of claim 1, wherein the selectable items match the user input when metadata of the selectable item contains the user input.

8. The computer readable media of claim 7, wherein the metadata comprises an item name.

9. The computer readable media of claim 7, wherein the metadata comprises an item author.

10. The computer readable media of claim 1, wherein the selectable items match the user input when contents of the selectable item contain the user input.

11. The computer readable media of claim 5, wherein the graphical user interface orders items within each group based on a modification date or time of each item.

12. The computer readable media of claim 5, wherein the graphical user interface orders items within each group based on how each item matches the user input.

13. A method for locating selectable items stored on a computer system, said method comprising steps of:
   displaying on a computer display device a graphical user interface comprising a start button;
   responsive to detecting a selection of the start button, displaying a program launch menu comprising a plurality of selectable items, each corresponding to an application program, and the program launch menu comprising a search text input box, and
   wherein the program launch menu comprises, subsequent to a user inputting text in the search text input box, search results displayed within a predefined area of the program launch menu, wherein the search results comprise selectable items based on the user input.

14. The method of claim 13, further comprising providing a selection focus to a first search result having a top relevance to the user input.

15. The method of claim 13, wherein displaying search results comprises arranging the search results into one or more groups. according to a type of each matching selectable item.

16. The method of claim 15, wherein the groups comprise at least two groups from a set of groups comprising programs, files, Internet locations, and communications.

17. One or more computer readable media storing computer executable instructions executing to perform a method for locating selectable items stored on a computer system, said method comprising steps of:

displaying on a computer display device a graphical user interface comprising a start button;

responsive to detecting a selection of the start button, displaying a program launch menu comprising a plurality of selectable items, each corresponding to an application program, and the program launch menu comprising a search text input box, and wherein the program launch menu comprises a predefined area for displaying search results of searches conducted from a user inputting text within the search text input box, wherein the search results comprise selectable items based on the user input.

18. The computer readable media of claim 17, said method further comprising providing a selection focus to a first search result having a top relevance to the user input.

19. The computer readable media of claim 13, wherein displaying search results comprises arranging the search results into one or more groups according to a type of each matching selectable item.

20. The computer readable media of claim 15, wherein the groups comprise at least two groups from a set of groups comprising programs, files, Internet locations, and communications.

* * * * *